United States Patent

Neuhouser

[15] 3,676,739
[45] July 11, 1972

[54] MINE POWER SYSTEM GROUND CONTINUITY CHECK CIRCUIT

[72] Inventor: Donald E. Neuhouser, Fort Wayne, Ind.
[73] Assignee: General Electric Company
[22] Filed: Sept. 7, 1971
[21] Appl. No.: 178,338

[52] U.S. Cl. .............................317/18 C, 317/26, 317/54, 324/51
[51] Int. Cl. ..........................................H02h 3/16
[58] Field of Search.....................317/54, 26, 18 D, 31, 18 C; 324/51

[56] References Cited

UNITED STATES PATENTS

| | | | |
|---|---|---|---|
| 3,308,346 | 3/1967 | Martzloff et al. | 317/18 D |
| 3,492,533 | 1/1970 | Thurston | 317/18 D |
| 3,522,479 | 8/1970 | Parker | 317/18 D |

FOREIGN PATENTS OR APPLICATIONS

| | | | |
|---|---|---|---|
| 800,605 | 8/1958 | Great Britain | 317/18 D |

Primary Examiner—James D. Trammell
Attorney—John M. Stoudt et al.

[57] ABSTRACT

A ground cable continuity check circuit for a power supply cable system having a grounding and a pilot conductor electrically interconnected remotely from the power supply. A source of electrical energy for the check circuit is provided through a constant current transformer having its secondary connected between the grounding and pilot conductors. A circuit including the coil of an undervoltage relay and the contacts of a current relay is connected across the constant current transformer primary. The current relay coil is connected in series with the constant current transformer secondary and the grounding and pilot conductors. A voltage breakdown device is connected across the constant current transformer secondary to divert current from the current relay coil when a high impedance appears in the ground circuit for opening the current relay contacts to disable the under voltage relay. The power supply system may have a main cable and at least one branch cable in which case the grounding and pilot conductor loops of the main cable and branch cable are interconnected by a current transformer having one coil connected in the main grounding and pilot conductor loop and the other coil connected between the grounding and pilot conductors of the branch circuit.

9 Claims, 1 Drawing Figure

PATENTED JUL 11 1972
3,676,739
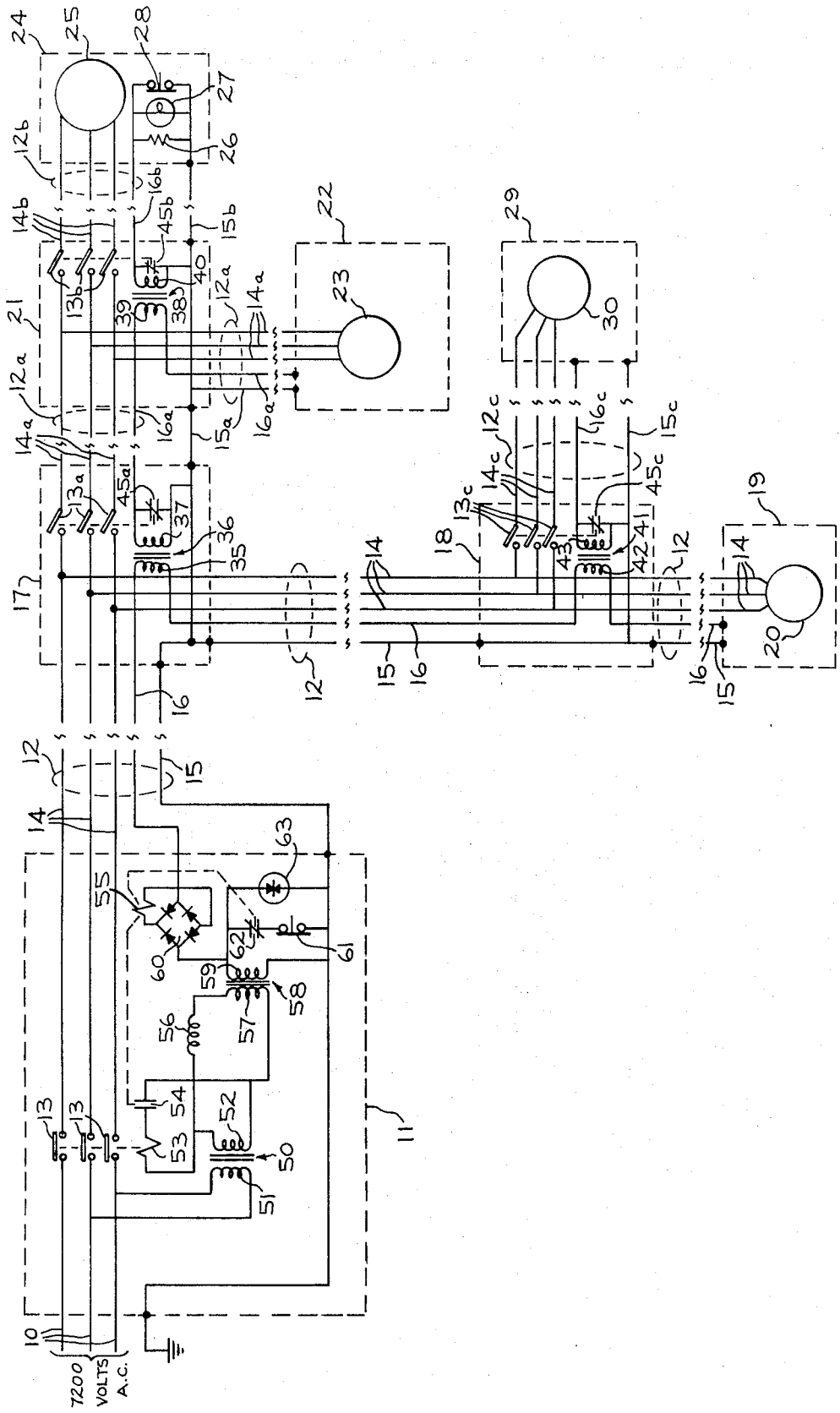

3,676,739

MINE POWER SYSTEM GROUND CONTINUITY CHECK CIRCUIT

BACKGROUND OF THE INVENTION

In a number of industries, such as the mining industry for instance, large equipment is operated with rather high voltage electrical energy. The electric power for such equipment is provided through a cable system having a number of power conductors and a grounding conductor, with the grounding conductor tying the entire system to a common ground to insure that the entire system is grounded. This substantially lessens shock hazards and the possibility of explosions resulting from electrical arcs. In many instances the power cable is subjected to rather rough treatment which may cause the grounding conductor to part or otherwise develop an excessively high resistance so that it is not effective for its intended purpose. Also in large installations the system may include a large number of separate components which are interconnected by separate cable sections and the connections may be faulty. This also would raise the impedance of the ground circuit to an unacceptable level.

It has been a practice to provide the cable with an additional conductor generally called a ground check or pilot conductor. The pilot conductor is electrically interconnected with the grounding conductor to provide a check system or circuit for continuously monitoring the condition of the ground cable. Prior art ground continuity check circuits have had a number of drawbacks. For instance many of them require that one signal for use in the circuit be generated in the main switch house while another signal is generated at each branch circuit switch house within the system. Also in many prior ground continuity check circuits it is necessary to recalibrate the circuit each time equipment is added to or removed from the supply circuit and each time the cable length is altered. Such repeated recalibration is unecessarily time consuming and may allow an undesired impedance to slowly build up within the system.

SUMMARY OF THE INVENTION

It is therefore an object of the present invention to provide a new and improved ground cable continuity check circuit.

It is another object of the invention to provide such a check circuit which incorporates only a single source of power for the check circuit.

It is a further object of the present invention to provide an improved ground cable continuity check circuit utilizing a constant current source of electrical energy.

It is still another object of the present invention to provide an improved ground cable continuity check circuit which may be utilized with a power system having a number of branches and in which varying numbers of pieces of equipment and portions of the circuit may be utilized without the necessity of recalibration.

It is still a further object of the present invention to provide a ground cable continuity check circuit system in which various branches of the ground conductor check circuit are electrically interconnected with the main ground conductor check circuit through current transformers.

Other objects and features of the present invention as well as many of the attendent advantages thereof will be appreciated more readily by reference to the following detailed description considered in connection with the accompanying drawing wherein the single FIGURE of the drawing is a schematic circuit diagram of a power supply cable system incorporating a ground cable continuity check circuit in accordance with one embodiment of the present invention.

DESCRIPTION OF THE PREFERRED EMBODIMENT

Referring now to the drawing, there is shown a somewhat simplified electrical schematic diagram of an exemplification power supply system for an installation such as a mine. Electrical energy for operation of various pieces of equipment in the mine is provided from a suitable external source and may, for example, be a three-phase 7,200 volt a-c supply. The three-phase supply conductor 10 extends into a main switch house or center 11 where it is selectively joined to a main mine power supply cable 12 through a three-phase primary switch 13. The cable 12, leading from the main switch house 11 includes three power conductors 14, as well as a grounding conductor 15 and pilot and ground check conductor 16. All of the conductors 14, 15 and 16 normally are encased in a single insulating covering schematically illustrated by the cable 12. The cable 12 extends into the mine and is often to provide electrical energy to a number of loads such as mining machines which often are located in different parts of the mine. Thus the power supply system may include several branches and therefore the illustrative schematic diagram has been drawn to show a number of branch circuits. As illustrated, the cable 12 extends to a first switch center 17 and then to a second switch center 18 and finally to a load such as a mining machine schematically illustrated at 19 which may have one or more electric motors schematically illustrated at 20 to which the power connector conductors 14 are connected. The grounding conductor 15 is electrically connected to each of the switch centers 17 and 18 and to the mining machine 19 all of which cannot be otherwise grounded effectively because of their portability. The pilot conductor 16 is electrically interconnected with the grounding conductor 15 at the mining machine 19 as is illustrated by showing both of these conductors connected to the housing of the machine.

At switch center 17 branch power conductors 14a of a branch cable 12a are selectively interconnected with the main power conductors 14 through a secondary power switch 13a. The power conductors 14a then extend to an additional switch center 21 and then another load or mining machine 22 where they are connected to an additional electric motor 23. A branch grounding conductor 15a is electrically connected to the main ground conductor 15 at the switch center 17 and extends through the switch center 21, to which it is connected, and then to the mining machine 22. A branch pilot conductor 16a extends from the switch center 17 through the switch center 21 to the mining machine 22 where it is electrically interconnected to the branch grounding conductor 15a.

At switch center 21 the branch power conductors 14b of an additional branch cable 12b are selectively interconnected with the branch conductors 14a through an additional secondary power switch 13b. The power conductors 14b extend from the secondary power switch 13b to a load or mining machine 24 where they are connected to an electrically operated device such as a motor 25. A branch grounding conductor 15b is connected to the branch grounding conductor 15a, the switch center 21 and the mining machine 24. A branch pilot conductor 16b extends from the switch center 21 to the mining machine 24. The pilot conductor 16b could be electrically interconnected with the grounding conductor 15b, either directly or by electrically connecting both of them to the machine 24. However, for purposes of illustration, the conductors 15b 16 b are interconnected by the parallel circuit arrangement of a small resistance 26 and a small electrical lamp 27 and a normally closed push-button switch 28. Normally the circuit from conductor 16b to conductor 15b is completed through the normally closed switch 28. When it is desired to check for current flow in these conductors and thus for circuit continuity, the switch 28 is opened and, if the circuit is continuous and current is flowing, the lamp 28 will come on. Similarly parallel arrangements of a resistance, a lamp and a normally closed switch may be used at various places within the power distribution system so that each of the sections of the system may be quickly checked to determine if that portion of the system is continuous and that the pilot wire has not accidentally contacted the ground wire, thereby defeating the checking function.

At switch center 18 the branch power conductors 14c of a branch cable 12c are selectively interconnected with the power conductors 14 by means of an additional secondary power switch 13c. Power conductors 14c extend to an additional mining machine 29 where they are electrically connected to a load such as a motor 30. The cable 12c also includes a branch grounding conductor 15c which interconnects the grounding conductor 15 and the mining machine 29 as well as a branch pilot conductor 16c which extends from the switch center 18 to the mining machine 29 where it is electrically interconnected with the ground conductor 15c as by connecting both of them to the mining machine.

In the switch center 17 a primary coil 35 of a current transformer 36 is connected in the pilot conductor 16. The secondary coil 37 of the current transformer is connected between the branch grounding conductor 15a and the branch pilot conductor 16a. Thus the grounding and pilot conductor loop of the branch cable 12a is electrically interconnected with the grounding and pilot conductor loop of the main cable 12 through the current transformer 36 which may, conveniently, have a one to one turn ratio. Similarly, the grounding and pilot conductor loop of the branch cable 12b is electrically interconnected with the grounding and pilot conductor loop of the branch cable 12a in the switch center 21 by means of a current transformer 38 which has one coil 39 connected in the pilot conductor 16a and the other coil 40 connected between the grounding conductor 15b and the pilot conductor 16b. Similarly at switch center 18 the grounding and pilot conductor loop of branch power cable 12c is interconnected with the grounding and pilot conductor loop of the main cable 12 by means of a current conductor 41 which has one coil 42 connected in the main pilot conductor 16 and its other coil 43 connected between the branch grounding conductor 15c and the branch pilot conductor 16c. Thus at the end of each of the branches of the power supply system the corresponding grounding conductor and pilot conductor are electrically interconnected as is illustrated at mining machines 19, 22, 24 and 29. However, the grounding and pilot conductor loop of each of the branch cables is electrically interconnected to the grounding and pilot conductor loop of the cable supplying electric energy to it by means of a current transformer which may conveniently have a one to one turn ratio. With this arrangement a discontinuity in the main grounding conductor 15 and pilot conductor 16 loop will cause a high impedance to appear across the main grounding and pilot conductor loop at the main switch housing or center 11. This may be caused by a break in one of these conductors or a bad connection at one of the switch housings or the mining machine served by that cable, for instance. A similar discontinuity or high impedance across any of the branches of the circuit will be reflected through the appropriate current transformers to the main grounding and pilot conductor loop so that it also will cause a similar high impedance to appear across the main grounding and pilot conductor loop at the main switch housing or center 11.

Each of the secondary power switches 13a, 13b and 13c is mechanically interconnected with one of switches 45a, 45b, and 45c respectively so that the switches 45a, 45b, and 45c are closed when the secondary power switches 13a, 13b, 13c respectively are open and are open when the secondary power switches are closed. The switches 45a, 45b, and 45c are connected in shunt with the current transformer coils 37, 40 and 43 respectively so that when any of the branch power circuits 12a, 12b or 12c are deenergized, by opening the associated secondary power switch, the secondary coil of the associated current relay is effectively shorted by the switch 45a, 45b, or 45c. Thus a branch of the circuit may be disconnected from the system without the disconnection of that portion of the system causing a high impedance to appear in the main grounding and pilot conductor loop.

Referring now to the main switch center 11, a step-down transformer 50 is provided with its primary coil 51 connected across two of the incoming supply conductors 10. The secondary coil 52 of the transformer 50 supplies power to two circuits. A first circuit includes the coil 53 of an undervoltage relay and one set of contacts 54 of a current relay having a coil 55. The undervoltage relay coil 53 is mechanically interconnected with the main or primary switch 13 and serves as a holding relay. That is, the main power switch 13 must be closed manually and, when closed, it will remain closed only so long as sufficient current flows through the undervoltage relay coil 53. If the current through the undervoltage relay coil 53 drops below a predetermined value the primary switch 13 will open, deenergizing the power conductors 14. The current relay contacts 54 are normally open and are closed in response to a current of at least a predetermined value flowing through the current relay coil 55. With this arrangement the undervoltage relay coil 53 will serve to hold the main power switch 13 closed only if a predetermined value of current is flowing through the current relay coil 55.

A second circuit including a reactor 56 and the primary coil 57 of a constant current transformer 58 is also connected across the secondary coil 52 of the step-down transformer 50 in parallel with the under voltage relay coil 53 and contacts 54. The constant current transformer 58 includes a secondary coil 59, one side of which is connected to the grounding conductor 15. The other side of the secondary coil 59 is connected to the pilot conductor 16 through a diode bridge 60 and the current relay coil 55 a circuit including a normally closed manual switch 61 and a set of normally closed contacts 62 is connected across the constant current transformer secondary 59. The contacts 62 are controlled by the current relay 55 so as to be open only when a current of a predetermined value is flowing through the relay and to be closed at all other times. The switch 61 is normally closed but may be momentarily opened by being manually actuated. A voltage breakdown device 63 also is connected across the constant current transformer secondary 59. The voltage breakdown device is illustrated as a thyrector diode. Such a device has a predetermined breakdown voltage so that when that voltage across the diode is reached it will begin to conduct current and, within the limits of its capability, will conduct as much current as necessary in order to maintain essentially its breakdown voltage. The voltage responsive device 63 also could take the form of a zener diode for instance which has characteristics similar to a thyrector diode but is made of different material, or it may be a silicone controlled rectifier and associated gate circuit for gating or turning on the rectifier at a predetermined voltage across the coil 59. The voltage responsive means or device 63 may take other forms well known in the art it only being required that it has the characteristic of conducting current in response to a predetermined voltage across the secondary coil 59 of the constant current transformer 58.

With the circuit as illustrated the step-down transformer 50 provides an input current to the primary coil 57 of the constant current transformer which current is limited by the reactor 56. The undervoltage relay is deenergized because the contacts 54 are open and the current of secondary 59 of the constant current transformer is shunted from flow through the current relay coil 55 by the push-button switch 61 and normally closed contacts 62. If the main power switch 13 is closed it will immediately reopen because the undervoltage relay coil 53 is not energized.

When it is desired to provide electric energy to the system the manual switch 61 is opened. This allows the constant current transformer 58 to cause a current flow through the loop formed by the grounding conductor 15 and pilot conductor 16. This current flows through the current relay 55 so that the contacts 54 are closed and the contacts 62 are opened. When the push-button switch 61 is released the current will continue to flow through the ground cable continuity check circuit since the contacts 62 are open. Also the undercurrent voltage relay coil 53 will be energized because the contacts 54 are closed. Thereafter the main power switch 13 may be manually closed and will be held in its closed position by the undervoltage relay coil 53. With this arrangement power is provided through the switch center 17 and switch center 18 to the mining machine 19. If it is desired to energize one or more of the various branch circuits the appropriate secondary power switches 13a, 13b and 13c may be closed. The closing of these switches will open the associated switches 45a, 45b and 45c effectively interconnecting their grounding and pilot conductor loops with the main grounding and pilot conductor loops.

In the event that a discontinuity is present or develops in the grounding or pilot conductor in any portion of the system such a discontinuity will cause a high impedance to appear across the ground conductor 15 and pilot conductor 16 at the main switch center 11. When this occurs the constant current transformer 58 will attempt to continue to provide a constant current through the ground cable continuity check circuit and thus through the high impedance. This causes the voltage across the secondary coil 59 on the constant current transformer to rise. When that voltage reaches the breakdown or firing voltage of the voltage responsive device 63 it will begin to conduct and bleed current away from the diode bridge 60 and current relay 55. When this occurs insufficient current flows through the current relay coil 55 to enable it to hold contacts 54 closed and contacts 62 open. Therefore contacts 54 open and contacts 62 close.

The opening of contacts 54 effectively deenergizes the undervoltage relay coil 53 so that it no longer will hold the main power switch 13 closed and the main power switch 13 opens, removing energy from the power conductors 14. The closing of contacts 62 completes a shunt across the secondary 59 of the constant current transformer 58 so that, even though this continuity in the grounding or pilot conductor network may be only momentary the ground continuity check circuit is dissabled and the power system cannot be reenergized until the push-button 61 is again manually opened.

With the grounding and pilot conductor loop of each of the branches of the power system being interconnected to the main grounding and pilot conductor loop through one or more current transformers a discontinuity in any of the branches will cause the same high impedance to appear across the main grounding conductor 15 and pilot conductor 16 at the main switch housing 11 as if that same discontinuity had appeared in the main grounding and pilot conductor loop. This enables the ground cable continuity check circuit to quickly respond to a discontinuity anywhere in the grounding or pilot conductor system while at the same time only having to provide power to the ground cable continuity check circuit at the main switch housing. This greatly simplifies the entire circuitry. The use of a constant current source and associated sensing and control elements enables the ground cable continuity check circuit to be used with a long and involved power circuit having a large number of switch centers and loads and a wide variation of total length of power cable without the necessity of recalibrating the circuit each time the length of cable is changed, the number of energized branches is changed or the number of loads is changed.

It will be apparent to those skilled in the art that while I have described what at present is considered to be the preferred embodiments of this invention, in accordance with the patent statutes, changes may be made in the disclosed exemplification without actually departing from the true spirit and scope of this invention.

What I claim is new and desire to secure by Letters Patent in the United States is:

1. In a ground cable continuity check circuit for a power supply cable having a grounding conductor and a pilot conductor, said grounding conductor and said pilot conductor being electrically interconnected remotely of the power supply:
   a. a constant current source interconnecting said grounding and pilot conductors;
   b. current responsive means connected in series with said grounding and pilot conductors, said current responsive means having a first condition in response to a current of at least a predetermined level and a second condition when the current is less than the predetermined level; and
   c. voltage responsive means connected across said constant current source for selectively diverting current from said current responsive means to reduce the current therethrough below the predetermined level in response to the existence of a predetermined impedance between said grounding and pilot conductors.

2. A ground cable continuity check circuit as set forth in claim 1 wherein: said constant current source includes a constant current transformer having its secondary connected between said grounding and pilot conductors.

3. A ground cable continuity check circuit as set forth in claim 2 wherein: said current responsive means includes a current relay having its coil connected in series with said constant current transformer secondary and said voltage responsive means includes a voltage breakdown device connected in parallel with said constant current transformer secondary.

4. In a ground cable continuity check circuit for a power supply cable having a grounding conductor and a pilot conductor, said grounding conductor and said pilot conductor being electrically interconnected remotely of the power supply:
   a. a source of electric energy;
   b. a first circuit connected across said source of electric energy, including the coil of an under voltage relay and the contacts of a current relay;
   c. a second circuit connected across said source of electric energy, including the primary of a constant current transformer, the secondary of said constant current transformer being connected between said grounding and pilot conductors;
   d. the coil of said current relay being connected in series with said constant current transformer secondary, said current relay being effective only upon the flow of current of at least a predetermined level through its coil to close its contacts for enabling said under voltage relay; and
   e. voltage responsive means connected across said constant current transformer secondary for selectively diverting current from said current relay coil to reduce the current therethrough below the predetermined level in response to the existence of a predetermined impedance between said grounding and pilot conductors.

5. In a ground cable continuity check circuit for a power supply cable system having grounding and pilot conductors; the power supply cable system having a main cable and at least one branch cable:
   a. said main cable including a main grounding conductor and a main pilot conductor electrically interconnected to form a closed loop normally of low impedance, a fault in said main grounding conductor causing a high impedance to appear across said main cable grounding and pilot conductor loop;
   b. said at least one branch cable including a branch grounding conductor and a branch pilot conductor interconnected to form a closed loop normally of low impedance, a fault in said branch grounding conductor causing a high impedance to appear across said branch cable grounding and pilot conductor loop;
   c. a current transformer having its primary connected in said main cable grounding and pilot conductor loop and its secondary connected between said branch grounding and pilot conductors so that a high impedance across said branch cable grounding and pilot conductor loop will cause a high impedance to appear across said main grounding and pilot conductor loop; and
   d. control means responsive to a predetermined high impedance across said main grounding and pilot conductor loop to deactivate the power supply cable system.

6. A ground cable continuity check circuit as set forth in claim 5, wherein said control means includes;
   a. a constant current source interconnecting said main grounding and pilot conductors;
   b. current responsive means connected in said main grounding pilot conductor loop, said current responsive means having a first condition in response to a current of at least a predetermined level and a second condition when the current is less than the predetermined level, and c. voltage responsive means connected across said constant current source for selectively directing current from said current responsive means to reduce the current therethrough below the predetermined level in response to the existence of a predetermined high impedance across said main grounding and pilot conductor loop.

7. A ground cable continuity check circuit as set forth in claim 5 wherein: said constant current source includes a constant current transformer having its secondary connected between said main grounding and pilot conductors.

8. A ground cable continuity check circuit as set forth in claim 7 wherein: said current responsive means includes a current relay having its coil connected in series with said constant current transformer secondary and said voltage responsive means includes a voltage breakdown device connected in parallel with said constant current transformer secondary.

9. A ground cable continuity check circuit as set forth in claim 5 wherein said control means includes:

a. a source of electric energy;

b. a first circuit connected across said source of electric energy, including the coil of an under voltage relay and the contacts of a current relay;

c. a second circuit connected across said source of electric energy, including the primary of a constant current transformer, the secondary of said constant current transformer being connected between said main grounding and pilot conductors;

d. the coil of said current relay being connected in series with said constant current transformer secondary, said current relay being effective only upon the flow of current of at least a predetermined level through its coil to close its contacts for enabling said under voltage relay; and e. voltage responsive means connected across said constant current transformer secondary for selectively diverting current from said current relay coil to reduce the current therethrough below the predetermined level in response to the existence of a predetermined high impedance across said main grounding and pilot conductor loop.

* * * * *